(12) United States Patent
Pechtold et al.

(10) Patent No.: US 7,525,072 B2
(45) Date of Patent: Apr. 28, 2009

(54) HEATED O-RING

(75) Inventors: Rainer Pechtold, Russelsheim (DE); Thorsten Rohwer, Trebur (DE)

(73) Assignee: GM Global Technology Operations, Inc., Detroit, MI (US)

( * ) Notice: Subject to any disclaimer, the term of this patent is extended or adjusted under 35 U.S.C. 154(b) by 574 days.

(21) Appl. No.: 11/180,422

(22) Filed: Jul. 13, 2005

(65) Prior Publication Data

US 2007/0015013 A1 Jan. 18, 2007

(51) Int. Cl.
  *H05B 3/02* (2006.01)
  *H01M 8/00* (2006.01)
(52) U.S. Cl. .......................... 219/550; 429/13; 60/251; 392/441; 220/581; 220/582; 220/586
(58) Field of Classification Search ................. 219/550; 429/13; 60/251; 392/441; 220/581–2, 586
See application file for complete search history.

(56) References Cited

U.S. PATENT DOCUMENTS 5,514,852 A * 5/1996 Takamori et al. ............ 219/388
6,109,543 A * 8/2000 Bright et al. ................ 239/135

FOREIGN PATENT DOCUMENTS

DE  100 00 705 A1  7/2001

* cited by examiner

*Primary Examiner*—Shawntina Fuqua

(57) ABSTRACT

A heated O-ring that has particular application for providing sealing in the connector region of a compressed hydrogen storage tank in a fuel cell system. In one embodiment, an electrical heating wire is wound through the O-ring so that resistive heating is provide by applying an electrical potential to the wire so that the temperature of the O-ring does not decrease below a predetermined temperature. In another embodiment, electrical heating elements are provided adjacent to and in contact with the O-ring, where an electrical potential applied to the heating elements causes the heating elements to maintain the temperature of the O-ring.

19 Claims, 2 Drawing Sheets

HEATED O-RING

BACKGROUND OF THE INVENTION

1. Field of the Invention

This invention relates generally to a heated O-ring and, more particularly, to a heated O-ring for a compressed hydrogen tank for a fuel cell system.

2. Discussion of the Related Art

Hydrogen is a very attractive fuel because it is clean and can be used to efficiently produce electricity in a fuel cell. The automotive industry expends significant resources in the development of hydrogen fuel cell systems as a source of power for vehicles. Such vehicles would be more efficient and generate fewer emissions than today's vehicles employing internal combustion engines.

Typically hydrogen is stored in a compressed gas tank under high pressure on the vehicle to provide the hydrogen necessary for the fuel cell system. The pressure in the compressed tank can be upwards of 700 bar. In one known design, the compressed tank includes an inner plastic liner that provides a gas tight seal for the hydrogen, and an outer carbon fiber composite layer that provides the structural integrity of the tank. At least one pressure regulator is typically provided that reduces the pressure of the hydrogen within the tank to a pressure suitable for the fuel cell system.

It is important that the compressed hydrogen stored in the tank be prevented from leaking or diffusing out of the tank. Because hydrogen is a very light and diffusive gas, sealing the leaks is typically difficult, especially around the connection area to the outside of the tank. Thus, it is desirable to reduce the number of sealings and the complexity of the connection area to the tank. Also, typically the connecting structures in the tank are made of different materials, which also makes the sealing even more difficult.

As the hydrogen is removed from the compressed tank, the pressure of the hydrogen in the tank will decrease. When the pressure of a gas is reduced and the volume does not change, the temperature of the gas will also decrease. The effect of the decrease in the temperature will be limited because heat is transferred from the environment into the tank. If the flow rate of the hydrogen flowing out of the tank is high enough and/or the temperature of the environment is low enough, the temperature in the tank can fall below –80° C. Typically it is possible to limit the hydrogen flow rate so that –80° C. is the lowest temperature that occurs within the tank. Further, when the tank is being filled with hydrogen, the temperature of the hydrogen can increase to 80° C. due to the compression of the hydrogen inside of the tank, providing a temperature swing of –80° C. to 80° C. The materials that can seal hydrogen in this temperature range are difficult to produce.

If the temperature of the hydrogen within the tank decreases beyond a certain temperature, such as –80° C. around the liner and –40° C. at the tank seals, including O-rings and other sealings, the materials become brittle and possibly damaged, affecting the tank's gas tight performance. Therefore, there are limits as to how fast hydrogen and/or for how long hydrogen can be removed from the compressed tank in a fuel cell system.

FIG. 1 is a cut-away, cross-sectional view of a known compressed hydrogen storage tank 10 of the type discussed above. The tank 10 includes an outer structural layer 12 typically made of a graphite composite and an inner liner 14, typically made of a durable plastic, such as a high density polyethylene. The liner 14 provides the gas tight environment for the hydrogen, and the outer layer 12 provides the structural integrity for the compressed hydrogen gas. A metal boss 22, typically stainless steel, is provided between an opening 24 in the outer layer 12 and a neck portion 20 of the liner 14. An adapter 18 is mounted in the neck portion 20 of the liner 14 where a flange 26 of the adapter 18 abuts against an end of the neck portion 20, as shown. The adapter 18 is fitted in the tank 10 and remains in place. A connector 16 is threaded into an outer end of the boss 22 to be positioned against the flange 26. The connector 16 may also extend through the adapter 18 into the liner 14. The connector 16 may contain certain components, such as valves and sensors. The boss 22 is configured to be securely held between the outer layer 12 and the liner 14, to securely hold the adapter 18 to the neck portion 20, and to securely hold the connector 16 within the boss 22.

An O-ring 28 provides a seal between the neck portion 22 of the liner 14 and the adapter 18. Additionally, an O-ring 30 provides a seal between the flange 26 and end of the connector 16, as shown. The O-rings 28 and 30 help provide the sealing between the various elements of the connection area, especially at lower pressures. Other tank designs use O-rings at other locations.

A problem exists when using O-rings in this type of environment. Because the hydrogen being emitted from tank 10 can reach temperatures below –40° C., the O-rings 28 and 30 may also reach these temperatures. However, these temperatures affect the sealing ability of the O-ring material because they become brittle and lose seal integrity, possibly breaking. Various solutions have been suggested in the art to address this problem. One proposed solution limits the flow rate of the hydrogen from the tank 10 so that the temperature of the outlet region of the tank 14 does not fall below the temperature where the O-rings 28 and 30 could lose their sealing ability. However, this solution could be undesirable because the output power of the fuel cell stack-would be limited accordingly. Also, it is known to heat the connector area of the tank 10 with an electrical heating element or hot water so that the temperature of the O-rings is maintained above a desirable temperature. However, the known heating solutions are typically complex and costly because the entire connector area is heated, which requires a substantial amount of energy.

SUMMARY OF THE INVENTION

In accordance with the teachings of the present invention, a heated O-ring is disclosed that has particular application for providing sealing in the connector region of a compressed hydrogen storage tank in a fuel cell system. In one embodiment, an electrical heating wire is wound through the O-ring so that resistive heating is provided by applying an electrical potential to the wire so that the temperature of the O-ring does not decrease below a predetermined temperature. In another embodiment, electrical heating elements are provided adjacent to and in contact with the O-ring, where an electrical potential applied to the heating elements causes the heating elements to maintain the temperature of the O-ring.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a heated O-ring is merely exemplary in nature, and is in no way intended to limit the invention or its applications or uses. For example, the heated O-ring of the invention has particular application for a compressed hydrogen storage tank in a fuel cell system. However, as will be appreciated by those skilled in the art, the heated O-ring of the invention may have other applications.

Figure 1:
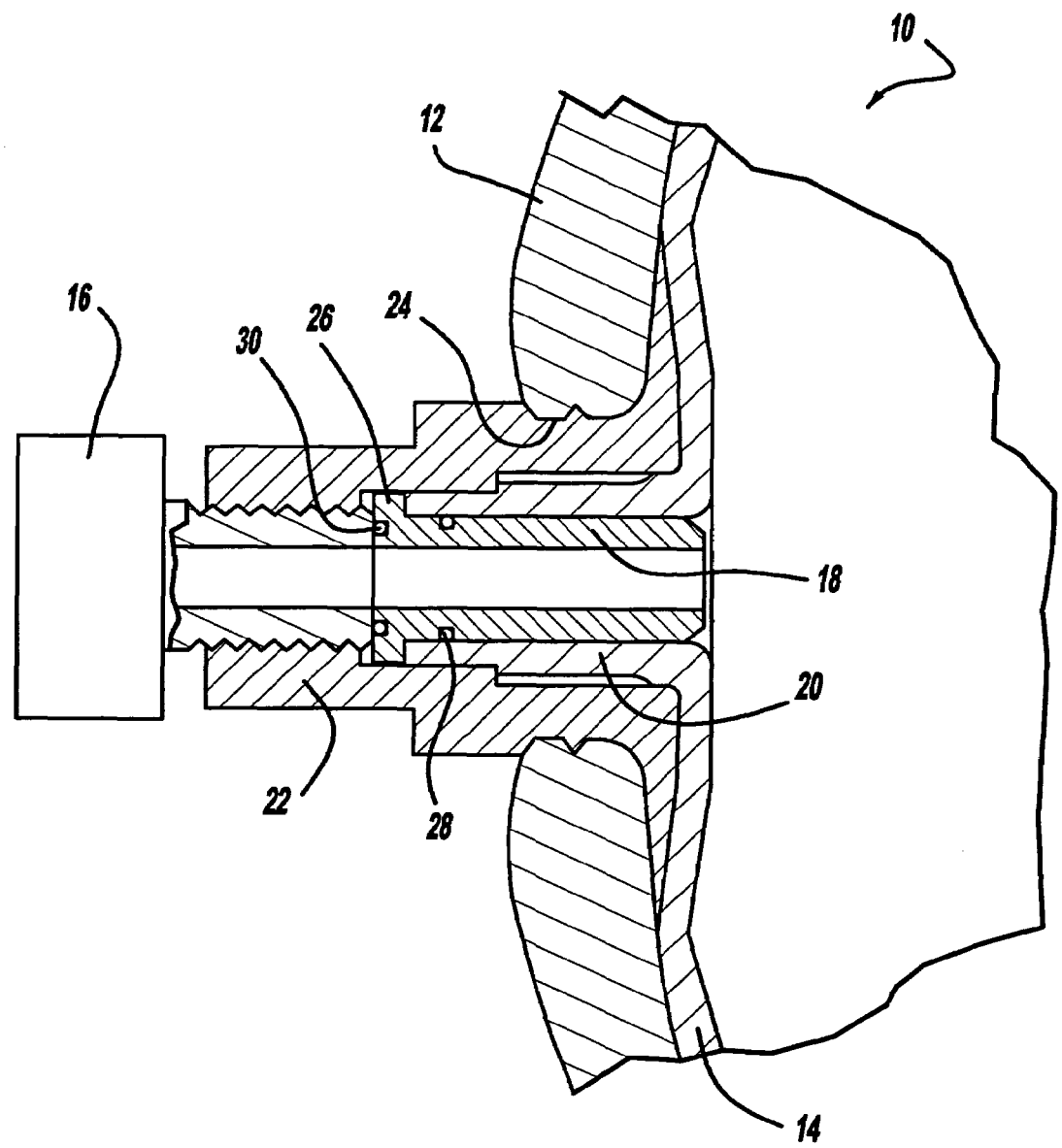
FIG. 1 is a cut-away, cross-sectional view of a connector area of a known hydrogen storage tank.
Figure 2:
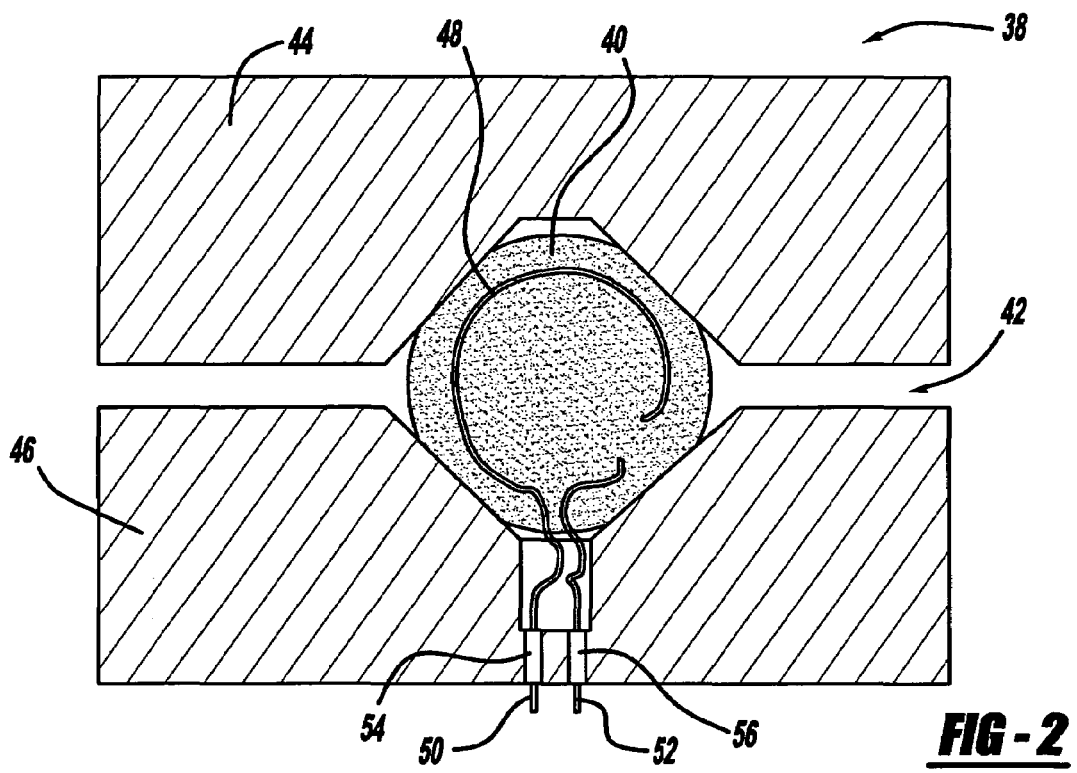
FIG. 2 is a cross-sectional view of an O-ring in a sealing position, where the O-ring includes an internal heating element.

FIG. 2 is a cross-sectional view of an O-ring assembly 38 including an O-ring 40 positioned within a sealing area 42 between a first structure 44 and a second structure 46. The structures 44 and 46 are intended to be any structure which requires a sealing O-ring, such as between the liner neck portion 20 and the adapter 18 or the adapter 18 and the connector 16, as discussed above. In this example, the O-ring 40 is sealing a high pressure container for the storage of high pressure hydrogen. As discussed above, the hydrogen may fall below a certain temperature as it is being withdrawn from the tank 10 where the seal integrity of the O-ring may be compromised. According to the invention, a wire heating element 48 is wound within and through the O-ring 40. The heating element 48 receives an electrical current to heat the heating element 48, and thus heat the O-ring 40. The wire heating element 48 can be wound through the O-ring 40 in any suitable manner that provides a desired level of heating, such as a coil.

Ends 50 and 52 of the wire heating element 48 extend outside of the structure 46 to receive an electrical potential. Because this area of the structure 46 may be subjected to high pressures and a wide range of temperatures, a careful design must be used to maintain the integrity of the structure 46. In this non-limiting embodiment, glass or glass ceramic connectors 54 and 56 are provided around the ends 50 and 52 within the structure 46, respectively, as shown. This allows the electrical connections to the heating element 48 to be sealed against hydrogen.

Figure 3:
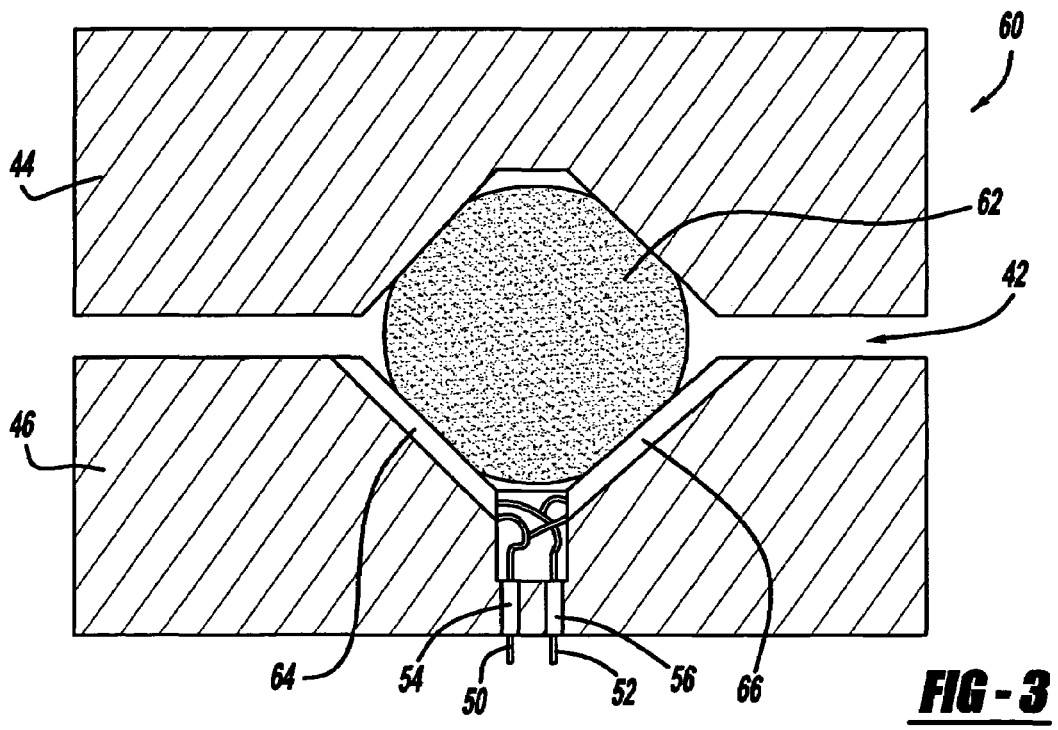
FIG. 3 is a cross-sectional view of an O-ring in a sealing position, where external heating elements are provided to heat the O-ring, according to another embodiment of the present invention.

FIG. 3 is a cross-sectional view of an O-ring assembly 60 including an O-ring 62, where like elements are identified by the same reference numerals as in the O-ring assembly 38, according to another embodiment of the present invention. In this embodiment, the wire heating element 48 internal to the O-ring 40 has been replaced with two external heating elements 64 and 66 that are positioned between the O-ring 62 and the structure 46, as shown. The heating elements 64 and 66 are planer electrodes that are flexible and conform to the area between the O-ring 62 and the structure 46, and extend the length of the O-ring 62. An electrical connection provides an electrical potential to the heating elements 64 and 66 to heat the O-ring 62 to prevent it from falling below a predetermined temperature. Other embodiments may include other heating elements for the O-rings 40 and 62 within the scope of the present invention.

Therefore, according to the invention, only the O-rings within the connection area of the tank 10 are heated, which limits the energy needed to prevent the O-rings 28 and 30 from falling below a predetermined temperature without having to limit the flow rate of the hydrogen being emitted from the tank 10.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An O-ring assembly comprising:
   a first structure;
   a second structure positioned adjacent to the first structure and defining a sealing area therebetween;
   an O-ring positioned in the sealing area between the first structure and the second structure; and
   at least one heating element positioned relative to the O-ring in the seating area, wherein the at least one heating element is a wire wound internal to the O-ring, said at least one heating element receiving an electrical potential for heating the O-ring.

2. The O-ring assembly according to claim 1 further comprising wires extending through the first structure and electrically connected to the heating element.

3. The O-ring assembly according to claim 2 further comprising a glass connector formed around the wires in the first structure.

4. The O-ring assembly according to claim 1 wherein the first structure is an adapter and the second structure is a liner associated with a compressed gas storage tank.

5. The O-ring assembly according to claim 1 wherein the first structure is an adapter and the second structure is a connector associated with a compressed gas storage tank.

6. The O-ring assembly according to claim 1 wherein the first and second structures are part of a compressed gas tank.

7. The O-ring assembly according to claim 6 wherein the compressed gas tank is a hydrogen storage tank for a fuel cell system.

8. The O-ring assembly according to claim 7 wherein the fuel cell system is on a vehicle.

9. An O-ring assembly for a compressed gas tank, said assembly comprising:
   a first structure;
   a second structure positioned adjacent to the first structure and defining a sealing area therebetween;
   an O-ring positioned in the sealing area between the first structure and the second structure;
   at least one heating element positioned relative to the O-ring in the sealing area, wherein the at least one heating element is a heating element positioned between the O-ring and the first structure; and
   at least one wire extending through the first structure and electrically connected to the heating element, said at least one wire receiving an electrical potential for heating the O-ring.

10. The O-ring assembly according to claim 9 wherein the at least one heating element is two separate heating elements positioned between the O-ring and the first structure.

11. The O-ring assembly according to claim 9 further comprising a glass connector formed around the wires in the first structure.

12. The O-ring assembly according to claim 9 wherein the first structure is an adapter and the second structure is a liner associated with the compressed gas storage tank.

13. The O-ring assembly according to claim 9 wherein the first structure is an adapter and the second structure is a connector associated with the compressed gas storage tank.

14. The O-ring assembly according to claim 9 wherein the compressed gas tank is a hydrogen storage tank for a fuel cell system.

15. The O-ring assembly according to claim 14 wherein the fuel cell system is on a vehicle.

16. An O-ring assembly comprising:

a first structure;

a second structure positioned adjacent to the first structure and defining a sealing area therebetween;

an O-ring positioned in the sealing area between the first structure and the second structure;

at least one heating element positioned relative to the O-ring in the sealing area, said at least one heating element receiving an electrical potential for heating the O-ring, wherein the at least one heating element is a heating element positioned between the O-ring and the first structure; and wires extending through the first structure and electrically connected to the heating element and a glass connector formed around the wires in the first structure.

17. The O-ring assembly according to claim 16 wherein the at least one heating element is a wire wound internal to the O-ring.

18. The O-ring assembly according to claim 16 wherein the at least one heating element is two separate heating elements positioned between the O-ring and the first structure.

19. The O-ring assembly according to claim 16 wherein the first and second structures are part of a compressed gas tank.

* * * * *